United States Patent
Jisland et al.

[11] Patent Number: 5,942,810
[45] Date of Patent: Aug. 24, 1999

[54] REGULATION DEVICE AND METHOD FOR COMPENSATING VARIATIONS IN A SUPPLY VOLTAGE IN A MICROWAVE TRANSMITTER

[75] Inventors: Håkan Jisland, Göteborg; Carl-Björn Alminger, Lindome, both of Sweden

[73] Assignee: Telefonaktiebolaget LM Ericsson, Stockholm, Sweden

[21] Appl. No.: 09/046,646

[22] Filed: Mar. 24, 1998

[51] Int. Cl.$^6$ .................................................. H02J 1/10
[52] U.S. Cl. ............................................... 307/44; 307/77
[58] Field of Search .................................. 307/73, 44, 77; 323/270, 271

[56] References Cited

U.S. PATENT DOCUMENTS

| | | |
|---|---|---|
| 3,710,148 | 1/1973 | Itoh . |
| 3,875,539 | 4/1975 | Fendrich, Jr. . |
| 4,160,996 | 7/1979 | Nigra et al. ........................... 307/77 |
| 4,358,688 | 11/1982 | Tamii ................................... 307/77 |
| 4,591,962 | 5/1986 | Schwarz et al. . |
| 4,682,369 | 7/1987 | Schrader . |

FOREIGN PATENT DOCUMENTS

| | | |
|---|---|---|
| 1112535 | 9/1984 | U.S.S.R. . |
| 96/13766 | 5/1996 | WIPO . |

*Primary Examiner*—Shawn Riley
*Attorney, Agent, or Firm*—Burns, Doane, Swecker, & Mathis, L.L.P.

[57] ABSTRACT

A regulating method and device are provided for compensating variations in a supply voltage to a microwave transmitter which includes a grid pulsed traveling wave tube. The devices includes a first capacitor and, in series with the first capacitor, a second capacitor connected to a control circuit. The control circuit, substantially in opposition to a current representing current variations through the first capacitor, conducts current through the second capacitor. The current through the second capacitor generates a compensation voltage which, together with a capacitor voltage across the first capacitor, forms the supply voltage.

25 Claims, 4 Drawing Sheets

REGULATION DEVICE AND METHOD FOR COMPENSATING VARIATIONS IN A SUPPLY VOLTAGE IN A MICROWAVE TRANSMITTER

The present invention refers to a method and a device, mainly for compensating variations in a supply voltage to a microwave transmitter. The device includes a first capacitor and in series with it a second capacitor connected to a control circuit.

Moreover, the invention refers to a radar transmitter, which includes a regulation device intended for regulation of variations, which can occur in the supply voltage to the microwave amplifier unit in the radar transmitter.

BACKGROUND

Within the radar engineering different types of microwave amplifier tubes for amplification of a radar signal are used, for example TWT (Travelling Wave Tube) or Klystron tube, which are grid pulsed tubes. TWT is mainly used within the frequency range of 1 GHZ–40 GHZ. To operate a TWT, usually, cathode voltages of −10 kV to −35 kV are required, whereby the ray speed is principally a function of the potential between the cathode and the anode. One problem is that the amplitude and the phase displacement of the emitted microwave signal are modulated through variations of the cathode voltage. When the radar pulse is emitted, the cathode current is delivered from an output capacitor $C_{out}$ and the voltage over it drops, which must be recharged between the pulses with a constant current. Usually, physical dimensions limit the size of the $C_{out}$ and maximal allowed stored energy.

"Staggered" transmission patterns are used in certain radar installations, preferably in installations of type pulse-Doppler radars, which means that the inter-pulse spacing (time between the pulses) is not constant. This means that the charge time for $C_{out}$ varies between different pulses, which results in varying cathode voltage. Therefore, the phase displacement of the transmitted radar signal will vary from pulse to pulse, which may have negative consequences for the ability of the system to suppress echoes from solid targets (so-called ground clutter) and results in deteriorated performance.

U.S. Pat. No. 4,682,369 discloses a solution, in which a radar transmitter includes a so-called "ripple and droop" reducing unit for decreasing the ripple and droop of the supply circuit of the transmitter. A filter capacitor for cathode supply is connected to the voltage supply and an operational amplifier (OP-amplifier) has its balanced AC-input connected across the output capacitor. An amplifier stage inverts the signal from the OP-amplifier and amplifies its absolute value to the same value that occurs across said filter capacitor. A follow-up stage, connected to the amplifier stage, receives the inverting signal and produces an output signal in series with the filter capacitor for elimination of the ripple, which output signal is supplied to a TWT connected to the supply capacitor.

In this assembly, the ripple is measure across the output capacitor of the cathode voltage supply and a mirror image of the ripple voltage is added via a series resistance to the cathode voltage. Hence, the ripple voltage is compensated. A major drawback with this solution, because of its construction, is the consumption of a relative large amount of power. Furthermore, the high voltage is connected directly to the detecting circuit, which make great demands upon the components. Moreover, the circuit lacks a closed regulation loop.

The Soviet patent document, SU 1112535 A, describes a regulation arrangement for compensating the variations in the supply voltage in a microwave transmitter. The arrangement includes a first capacitor, a second capacitor arranged in series with said first capacitor and a control circuit connected to the second capacitor. The control circuit, through a voltage divider (14), detects a supply voltage to the transmitter tube and no current is conducted through the capacitor. Thereby, the control circuit in cooperating with a power unit (20) generates a voltage across the second capacitor. Thus, the supply voltage to the tube consists of the sum of three voltages, i.e. the voltage across the power unit (20), the voltage across the first capacitor and the voltage across the second capacitor.

SUMMARY

One object of the present invention is to provide a regulation device, preferably for a radar transmitter, in particular including a TWT or Klystron tube, which improves the phase coincidence between pulses, i.e. compensates for the stagger and allows a better possibility to suppress so-called ground clutter.

Another object of the present invention is to provide a regulation device, which accurately and quickly regulates and compensates the cathode voltage, as well as counteracts the potential drop at load variations, in particular for start transients.

Yet another object of the present invention is to produce a regulating system with a high bandwidth.

Moreover, the device according to the present invention consumes smaller power than prior art.

These objects have been achieved by the control circuit of the regulating device, according to the preamble, substantially in opposition to a current representing current variations through the first capacitor conducts a current through the second capacitor. Said current through said second capacitor generates a compensating voltage, which together with a capacitor voltage across the first capacitor constitutes the supply voltage.

In an examplary embodiment, the regulation device includes a detecting circuit for generating a measured value, essentially representing the variations in the supply voltage. Preferably, the detecting circuit includes a current transformer connected to the first capacitor for detecting a current through said capacitor and an integrator for integration of current through the capacitor.

In an embodiment the detecting circuit primarily includes integrator circuits and an amplifier stage. The detecting circuit is connected via current transformers, essentially galvanically insulated, to the first capacitor and the second capacitor.

In an embodiment, the control unit primarily includes at least a supply source, switching elements, inductance elements and the second capacitor, the switching elements operating essentially in a reverse phase.

In an embodiment, the supply source of the control unit consists of a reservoir capacitor and a possible safety circuit.

Furthermore, the regulation device in an embodiment is characterised in that the regulating circuit includes a first amplifier unit connected to an output of said detecting circuit and to a reference voltage, a second amplifier unit connected to an output of said first amplifier unit and having an input signal representing the voltage of the control circuit's output, and a third amplifier unit with an input signal representing a current in the control unit and the output signal from the second amplifier unit.

In an embodiment, the regulation device includes a voltage divider circuit for generating a measured value, which mainly represents variations in the power supplied to the microwave transmitter.

A radar transmitter, according to invention, includes a microwave transmitter, a voltage source for supplying a first capacitor, partly connected to said voltage source and partly to the microwave transmitter and a regulation device for compensating the variations in a supply voltage fed to the microwave transmitter. The regulation device consists of a first capacitor in series with a second capacitor belonging to a control circuit, which essentially in opposition to a current representing current variations through the first capacitor, conducts the current through the second capacitor and generates a compensating voltage, which together with a capacitor voltage across the first capacitor constitutes a supply voltage to the microwave transmitter.

A method according to the invention includes the steps of detecting a current through a first capacitor, across which a capacitor voltage is generated and a second capacitor, arranged in series with the first capacitor and belonging to a control circuit, which conducts a current through the second capacitor, producing a measured value through the detection representing voltage variations, controlling the control unit, which with regard to said representation of the voltage variations conducts a current through the second capacitor, which is charged and discharged and thereby a compensating voltage is generated, which is substantially added in series with the capacitor voltage and together with this constitutes the supply voltage supplied to the microwave transmitter.

According to invention the circuit for detecting voltage ripples from a supply unit connected to an output capacitor primarily includes, a current transformer connected to the capacitor for detecting the current through the capacitor and an integrator for integration of the current through the capacitor, the integrator output signal representing the ripple.

BRIEF DESCRIPTION OF THE DRAWINGS

In the following, the invention will be described with reference to embodiments illustrated on the attached drawings, in which.

DETAILED DESCRIPTION

Figure 1:
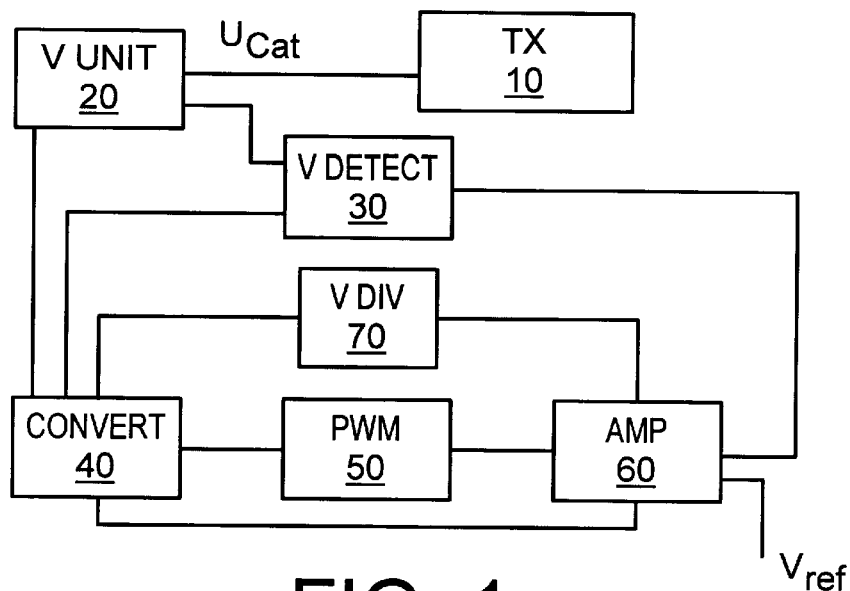
FIG. 1 is a block diagram for a part of a microwave transmitter, including a regulation device according to the present invention.

The block diagram for a part of a microwave transmitter, shown in FIG. 1, basically includes a transmission unit 10, a cathode voltage generation block 20, a voltage detection block 30, a conversion block 40, a pulse width modulator block 50, an amplifier/regulating block 60 and a voltage divider block 70.

Figure 2:
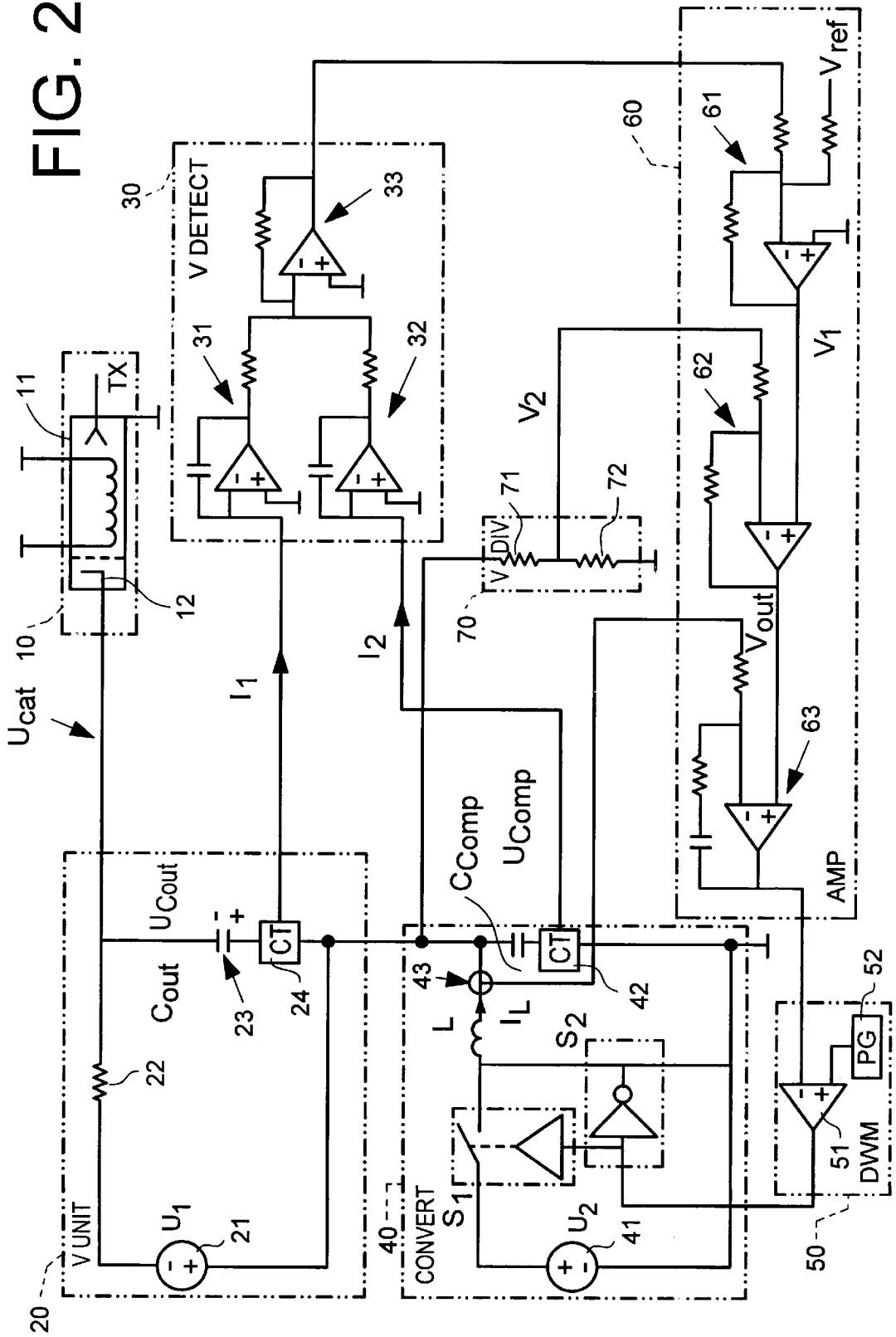
FIG. 2 is a wiring diagram for the components in different blocks, according to FIG. 1.

FIG. 2 is a detailed wiring diagram of an embodiment, according to FIG. 1. The block limits according to FIG. 1 are marked with dashed lines. For the reason of clarity, the main parts of the regulation system of the device, according to FIG. 2, are shown in a regulating block diagram in FIG. 3, in which relevant regulating functions are characterised with corresponding component or unit designation signs.

The transmission unit 10 according to FIG. 2 mainly includes a Travelling Wave Tube 11 (TWT) or Klystron tube, the cathode of which is designated with 12. The energy to the cathode 12 is supplied from the cathode voltage generation block 20.

The cathode voltage generation block 20 primarily includes a voltage source 21, a resistor 22, an output capacitor 23, $C_{out}$, and a current transformer 24. The cathode 12 is supplied with a current from the output capacitor $C_{out}$. The output capacitor is firstly charged through the voltage source 21, which can be an external or internal, direct or transformed voltage source, which provides the voltage $U_1$. A voltage $U_{out}$ is generated across the output capacitor $C_{out}$.

The detection block 30, for detecting the voltage alterations and ripple, includes a first and a second integrator 31 and 32 and also an amplifier stage 33, consisting of an OP-amplifier stage of known type. The detection is conducted indirectly through integrating the current $I_1$ in $C_{out}$, which which is transformed by means of the current transformer 24 the first integrator 31, summing it with results from the integrator 32, which is the regulation deviation e (FIG. 3) and amplifying in the amplifier stage 33. In this way, a measured value is produced, which essentially represents the cathode voltage variation, substantially without the DC-component (which can be in order −10 kV to −35 kV) with a good dissolution and high bandwidth. The function of the second integrator 32 is described below in connection with the description of the conversion block 40.

The conversion block 40 can be characterised with a controllable current source including an adjusting converter, consisting of a voltage source 41, two switching elements $S_1$ and $S_2$, respectively, an inductance L, a compensating capacitor $C_{comp}$, a current transformer 42 and a current detector 43. The compensating capacitor $C_{comp}$ is connected between the return connection of the cathode voltage supply unit and the ground, in series with the output capacitor $C_{out}$. The compensating capacitor's value is essentially appreciably larger than the value of the output capacitor $C_{out}$ of the cathode voltage supply unit ($C_{comp} \cong 10 C_{out}$). This is to reduce the influence on the cathode voltage drop during the pulsation.

Figure 3:
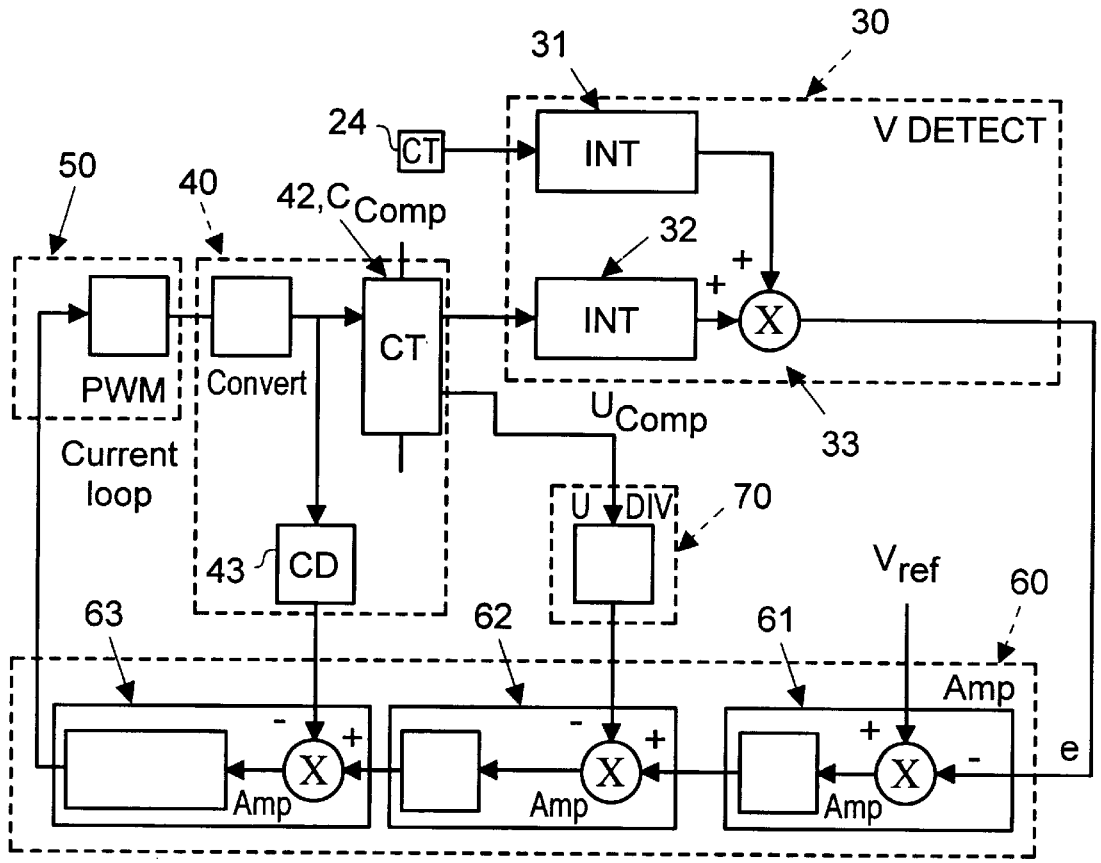
FIG. 3 illustrates, very schematically, part of the microwave transmitter shown in FIGS. 1 and 2, as a regulating system.

In the block diagram according to FIG. 3, $C_{comp}$ and the current transformer 42 are shown, very schematically, as a common block and only with connections essential for the regulating block.

In the converter $S_1$ conducts when $S_2$ is open and vice versa. As the relationship, i.e. the phase of work, between $S_1$ and $S_2$ can be adjusted, the charging of the $C_{comp}$ and thereby the voltage across the $C_{comp}$ can be controlled. The switching elements work essentially in opposition and the medium current through the output of the converter is, for example, about zero at 50% phase of work for the switches $S_1$ and $S_2$. The switching elements can consist of transistors, for example MOS-FET, bipolar transistors or the like. The switching elements $S_1$ and $S_2$ are preferably connected to a pulse width modulator 50 and controlled by this. The connection with the two switching elements $S_1$ and $S_2$, enables for the converter in a first state to charge the $C_{comp}$ and in a second state to obtain current from $C_{comp}$ and reduce the voltage $U_{comp}$. The converter, through its construction, obtains an internal current detecting regulating loop, which enables it to conduct charge-current to $C_{comp}$ in an accurate way.

The inputs of the switching elements $S_1$ and $S_2$ can also be connected to driving circuits and control circuits to prevent the switching elements from conducting at the same time.

The second integrator 32 in the detection block 30 detects the voltage across $C_{comp}$. The current $I_2$ in $C_{comp}$ is transformed by the current transformer 42 and integrated by the second integrator 32. This detection, which is substantially identical to the detection of $I_1$, produces a measured value, essentially representing the voltage across $C_{comp}$. The detections across $C_{out}$ and $C_{comp}$ are added and amplified in the amplifier stage 33 and are used as an actual value in the regulating block 60.

In an exemplary, a reservoir capacitor (not shown) can be arranged parallel to the voltage source 41, which supplies the conversion circuit with voltage $U_2$, for example 400 V, and a number of resistors can be arranged across the capacitors to obtain a correct voltage divider. Furthermore, the circuit can be provided with a possible transient protection arrangement, such as a discharge gap.

The amplifier or the regulating block 60 includes a number of amplifier units 61–63. The block 60 is primarily arranged to adjust the signal to the pulse width modulator 50, which adjusts the phase of work of the conversion block. To the inverting output of the amplifier unit 61, the signal from the detection block 30 is added, i.e. the regulating deviation e, and the DC-level $V_{ref}$, i.e. the working point (resting voltage level) for $C_{comp}$. The amplifier unit 62 includes a differential amplifier with an input signal $V_1$ from the amplifier unit 61 and the converter's working point $V_2$, received from the voltage divider block 70. The output signal from the amplifier unit 62 is $V_{out}=V_2-V_1$. The amplifier unit 63 substantially regulates the signal to the pulse width modulator 50. The input signal to the amplifier unit 63 is $V_{out}$ from the amplifier unit 62 as well the current $I_L$ through the inductance L in the conversion block 40. The current $I_L$ may be detected, for example by means of a so-called Hall element, which is assumed to be known for a person skilled in the art and not described closer. The difference between the $V_{out}$ and the voltage representing $I_L$ is amplified and fed to the pulse width modulator block 50.

The pulse width modulator block 50 consists of a comparator 51 with input signals from a pulse generator 52, for example a sawtooth pulse generator, and a signal representing the current-error from the amplifier unit 63.

The pulse width modulator, the amplification stage 63, the current detector 43 and the conversion block 40 include a current loop in the regulating system.

The voltage divider block 70, which is shown schematically in FIG. 2, consists of series resistors 71 and 72 dimensioned for desired voltage division for the voltage across $C_{comp}$, giving the converters voltage (the actual value).

Figure 4:
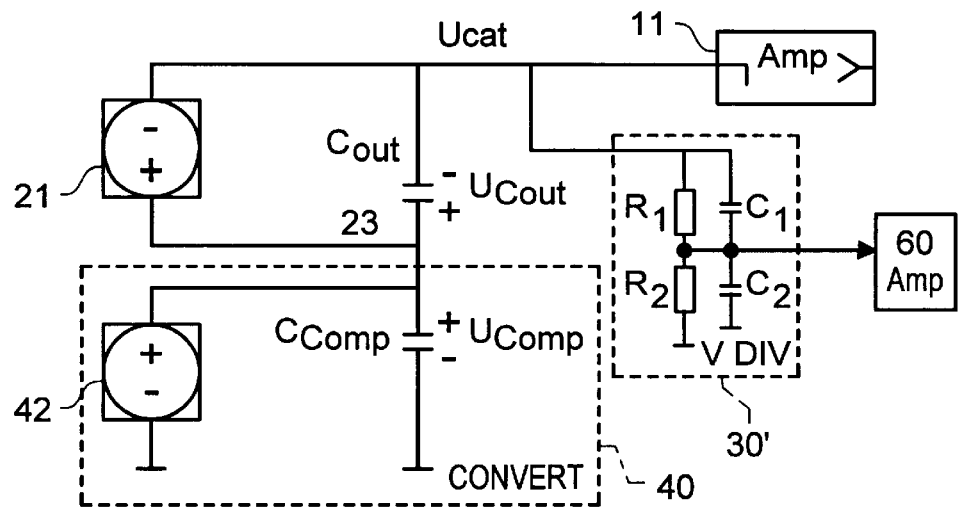
FIG. 4 is a second embodiment of part of the regulation device, according to the present invention.

FIG. 4 is a very schematic second embodiment, in which the voltage detection block 30 is replaced by a voltage divider block 30'. The voltage divider block 30' substantially includes a series of resistance $R_1$, $R_2$ parallel with capacitors $C_1$, $C_2$. The voltage value from this block is then coupled directly or indirectly, for example via an amplifier stage (not shown), to the amplification/regulating block 60.

Figure 5:
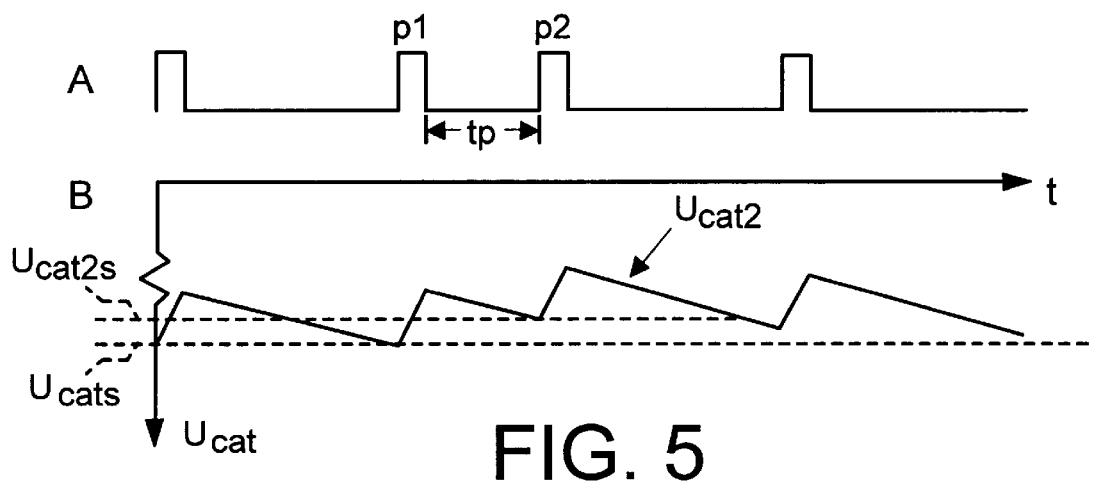
FIG. 5 is the cathode voltage with regard to the radar pulse with varying a pulse repetition rate without regulation.

For better understanding the regulation principle according to the present invention, the cathode voltage $U_{out}$ is shown in a staggered but unregulated radar installation in FIG. 5. The graph B is the unregulated cathode voltage $U_{out}$ by variant inter-pulse spacing with regard to the radar pulses shown in graph A. In the period between the pulses, the capacitor $C_{out}$ is charged to a level that depends on the pulse ratio. As it appears from the graph B, if the pulse p2 is generated within the time tp, the voltage $U_{out2}$ will not reach the start value $U_{out}$ and at p2 the voltage will have another start value, i.e. $U_{out2}$.

The function of the regulation device, according to the present invention, is as following. When the TWT 11 does not pulse, the regulation device according to the present invention holds the voltage across the compensating capacitor $C_{comp}$ to the value determined by the input signal to the amplifier unit 61, $V_{ref}$. The cathode voltage block 20 in this state will not be loaded and the signal from the detection block 30 is 0. When the pulsation starts, the current to the TWT will be taken from the output capacitor $C_{out}$ of the cathode voltage supply unit 20, whereby the voltage $U_{cout}$ across the capacitor $C_{out}$ decreases. Now, the detection block 30 detects the deviation of the cathode voltage from unloaded state. The controllable current converter in the block 40 is then regulated so that the charge of the compensating capacitor $C_{comp}$ is compensated for the cathode voltage deviation from the unloaded state before the next pulse. The voltage generated across the $C_{comp}$ is added in series with the voltage $U_{cout}$ across the $C_{out}$ and together form the supply voltage $U_{out}$ to the cathode. In this way, the phase and the amplitude modulation of the transmitted radar pulse caused by the cathode power supply unit is reduced.

Figure 6:
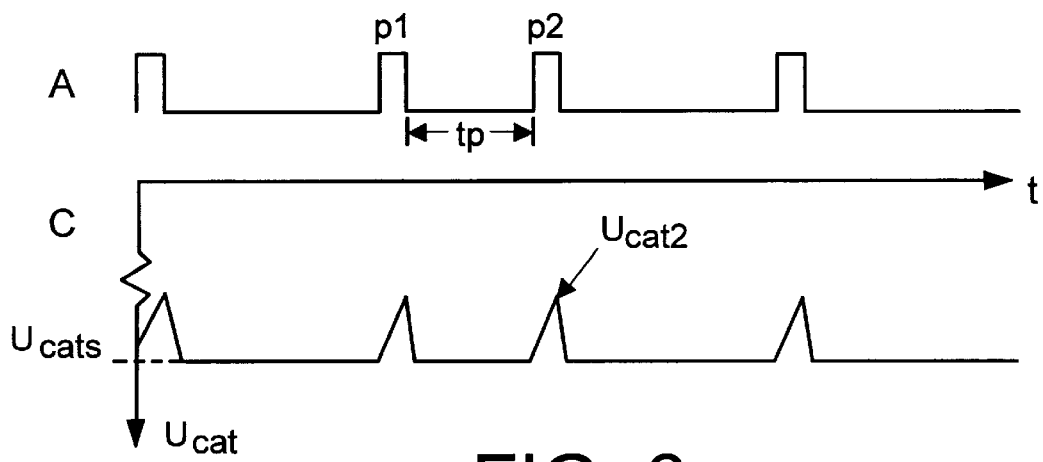
FIG. 6 is the cathode voltage with regard to the radar pulse with varying a pulse repetition rate with regulation, according to the present invention.

The graph C in FIG. 6 is the cathode voltage $U_{out}$ compensated according to the present invention. Here, the voltage $U_{out2}$ at the start of the pulse p2 corresponds to the cathode voltage $U_{comp}$ i.e. the same value as the start of the preceding pulse p1.

In an embodiment, a supervisory unit can be arranged, which measures the level of the out voltage and generates an alarm or a fault indicating signal, if the voltage/current exceeds/underpasses certain limits.

The output of the conversion block may vary because of output of the transmitter and phase of work of the switching elements. To stabilise the supply of the conversion block, it can be arranged with a regulating device, preferably a series regulator at the voltage supply.

By using current transformers, the regulation device, according to the present invention, is galvanically insulated from the high voltage supply.

Figure 7:
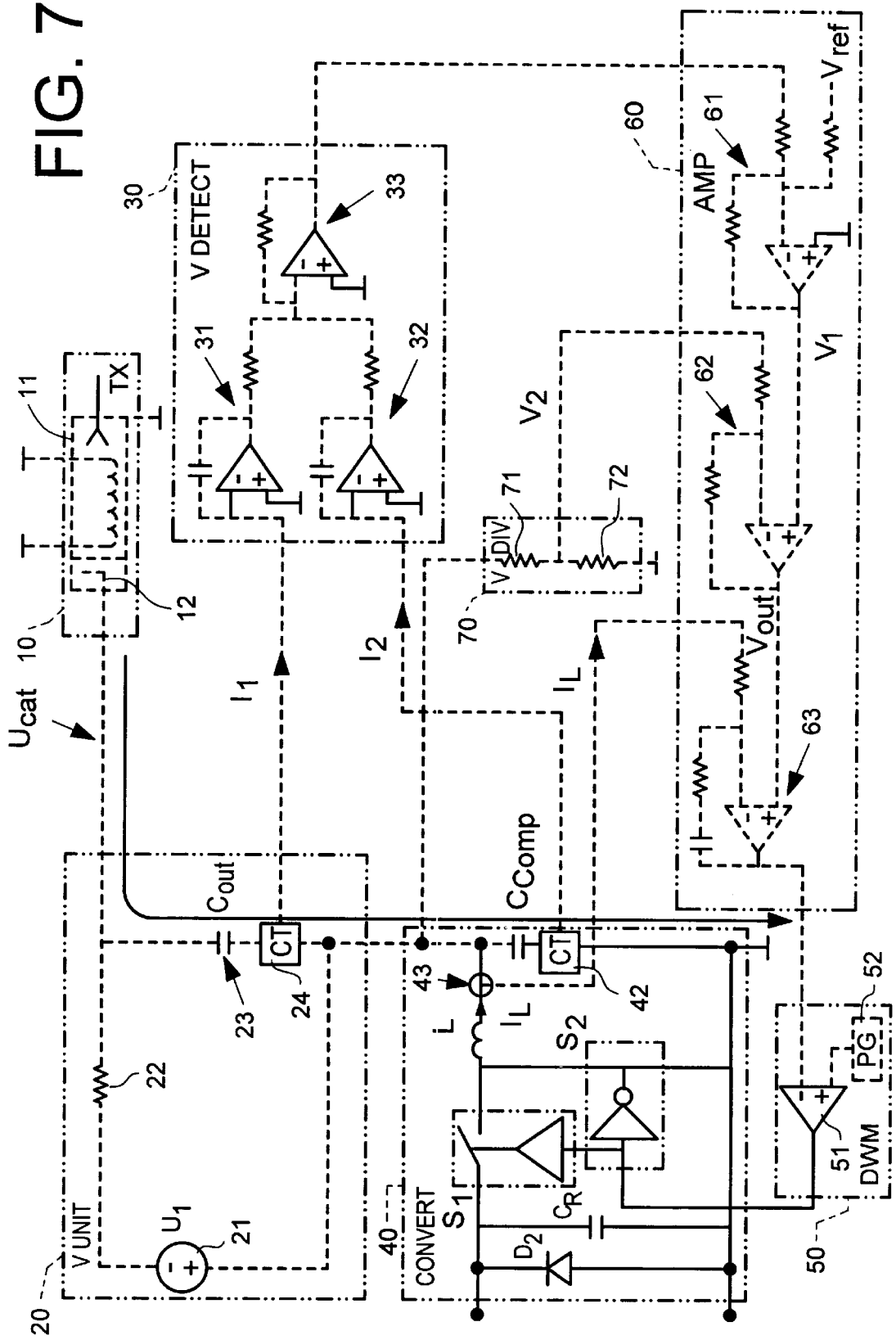
FIG. 7 is still another embodiment according to the invention with a modified control circuit.

In an embodiment, shown in FIG. 7, the voltage source 41 is replaced with at least one reservoir capacitor $C_R$. When the microwave transmitter 10 pulses, a current $I_w$ shown with an arrow is conducted from the cathode 12 to the ground. As it appears from FIG. 7, the current $I_w$ primarily passes through $C_{comp}$ which in this case charges the $C_{comp}$ positively. Then the regulator circuit 60 detects this voltage increase and controls the control unit 40 so that the conduction time for $S_2$ increases. During the conduction time of $S_1$, the excess charge generated the in the $C_{comp}$ is transported via the inductance L to the reservoir capacitor $C_R$, resulting in a voltage increase across the reservoir capacitor $C_R$. To limit the total voltage across the reservoir capacitor $C_R$, a safety circuit can be arranged, which in this case consists of a Zener-diode $D_z$.

Through this assembly, the surplus energy now can be utilised, for example to operate the control unit 40 or other electronics, and the power dissipation normally caused by the current $I_w$ is utilised in a much efficient way.

It is assumed obvious that the current $I_w$ through $C_{comp}$ originates from the pulsation of the transmitter 10. The circuit 40 must therefore be energised initially, which with advantage can be done through, for example, transformation and connection of a voltage, e.g. from the voltage source 21.

While we have illustrated and described exemplary embodiments of the invention, several variations and modifications within the scope of the attached claims may obviously occur.

DESIGNATION SIGNS
10 Transmitter
11 Amplifier tube
12 Cathode
20 The voltage unit block
21 Voltage source
22 Resistor
23 Capacitor
24 Current transformer
30 Voltage detection block
31, 32 Integrator
33 OP-Amplifier
30' Voltage divider block
40 Conversion block
41 Voltage source
42 Current transformer
43 Current detector
50 Pulse width modulator block
51 Comparator
52 Pulse generator
60 Amplifier block
61–64 Amplifier unit
70 Voltage divider block
71, 72 Resistor
$C_{out}$ Output capacitor
$C_{comp}$ Compensating capacitor
L Inductance
$C_R$ Reservoir capacitor
$D_z$ Zener-diode

What we claim is:

1. A regulation device for compensating variations in a supply voltage to a microwave transmitter, said device including a first capacitor being a member of a supply voltage feeding circuit and in series with the first capacitor a second capacitor connected to a control circuit, wherein said control circuit, substantially in opposition to a current representing current variations through said first capacitor, conducts a current through said second capacitor and said current through said second capacitor generates a compensating voltage which, together with a capacitor voltage across the first capacitor, forms the supply voltage.

2. The device of claim 1, wherein a detecting circuit is arranged to generate a measured value, substantially representing the variations in the supply voltage.

3. The device of claim 2, wherein said detecting circuit includes a current transformer connected to said first capacitor for detecting a current through said first capacitor and an integrator for integration of current through said first capacitor.

4. The device of claim 3, wherein said integrator output signal represents the voltage variation.

5. The device of claim 2, wherein a regulating circuit is connected to said detecting circuit and the control unit.

6. A device according to claim 2, wherein said detecting circuit includes integrator circuits and an amplifier stage.

7. A device according to claim 2, wherein said detecting circuit, via current transformers is connected to said first capacitor and second capacitor, substantially galvanically insulated.

8. The device of claim 1, wherein said control unit includes at least one supply source, switching elements, an inductance element, and the second capacitor.

9. The device of claim 8, wherein said switching elements operate substantially in opposition.

10. The device of claim 8, wherein said at least one supply source includes a reservoir capacitor.

11. The device of claim 8, wherein said at least one supply source includes a safety circuit.

12. The device of claim 2, wherein said regulating circuit includes a first amplifier unit connected to an output of said detecting circuit and to a reference voltage, a second amplifier unit connected to an output of said first amplifier unit and having an input signal representing a voltage of an output of said control circuit, and a third amplifier unit with an input signal representing a current in said control unit and said output signal from said second amplifier unit.

13. The device of claim 1, including a voltage divider circuit for generating a measured value, which substantially represents variations in said supply voltage to said microwave transmitter.

14. The device of claim 1, including a supervisory unit for monitoring upper and lower voltage limits.

15. The device of claim 1, including a supervisory unit for monitoring upper and lower current limits.

16. The device of claim 1, wherein said power supply of the control circuit includes a regulator circuit.

17. The device of claim 12, wherein said current in said control unit is detected with a Hall element.

18. The device of claim 1, wherein said second capacitor has a substantially bigger capacitance than the output capacitor.

19. The device of claim 1, wherein the second capacitor has a capacitance approximately ten times that of the first capacitor.

20. The device of claim 1, wherein the microwave transmitter includes a grid pulsed traveling wave tube.

21. A radar transmitter including a microwave transmitter, a voltage source for supplying a first capacitor being a member of a supply voltage feeding circuit partly being connected to said voltage source and partly to said microwave transmitter and a regulation device for compensating variations in a supply voltage supplied to said microwave transmitter, wherein the regulation device, in series with the first capacitor includes a second capacitor connected to a control circuit which, substantially in opposition to a current representing current variations through said first capacitor, conducts a current through said second capacitor and at it generates a compensating voltage which, together with a capacitor voltage across the first capacitor, forms the supply voltage.

22. The radar transmitter of claim 21, wherein the regulation device includes a detection circuit to produce a measured value, substantially representing variations in the supply voltage to said microwave transmitter, said control unit for conducting a current through said second capacitor, and a regulating circuit connected to said detecting circuit and said control unit.

23. The radar transmitter of claim 22, wherein said detecting circuit includes a current transformer connected to said first capacitor for detecting a current through said first capacitor and an integrator for integration of said current through said first capacitor and said integrator output signal representing the voltage variations.

24. The radar transmitter of claim 21, wherein said microwave transmitter includes a grid pulse travelling wave tube or Klystron tube.

25. A method for compensating variations in a supply voltage to a microwave transmitter which includes a grid pulsed travelling wave tube, wherein the method comprises the steps of:

detecting a current through a first capacitor being a member of a supply voltage feeding circuit and a second capacitor, across said first capacitor a capacitor voltage being generated and said second capacitor being arranged in series with the first capacitor and connected to a control circuit controlling a current through the second capacitor, generating a measured value representing the voltage variations through said detection, and controlling said control unit, which with regard to said representation of the voltage variations conducts a current through the second capacitor, which is charged and discharged, whereby a compensative voltage is generated which is added in series with the capacitor voltage and, together with it, forms the supply voltage to the microwave transmitter.

* * * * *